US010189201B2

(12) United States Patent
Guezennec et al.

(10) Patent No.: US 10,189,201 B2
(45) Date of Patent: Jan. 29, 2019

(54) METHOD FOR MANUFACTURING A HOLLOW BODY, IN PARTICULAR A FUEL TANK

(71) Applicant: Plastic Omnium Advanced Innovation and Research, Brussels (BE)

(72) Inventors: Yvonnig Guezennec, Venette (FR);
Stephane Toutain, Brussels (BE);
Jean-Francois Coing, Clairoix (FR);
Serge Dupont, Vilvoorde (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 90 days.

(21) Appl. No.: 15/157,844

(22) Filed: May 18, 2016

(65) Prior Publication Data
US 2016/0346987 A1    Dec. 1, 2016

(30) Foreign Application Priority Data

May 27, 2015   (EP) ..................................... 15305799

(51) Int. Cl.
*B29C 49/22*    (2006.01)
*B29C 49/00*    (2006.01)
(Continued)

(52) U.S. Cl.
CPC .......... *B29C 49/22* (2013.01); *B29C 49/0047* (2013.01); *B29C 49/04* (2013.01);
(Continued)

(58) Field of Classification Search
CPC ........ B29C 2049/2008; B29C 49/0047; B29C 49/20
(Continued)

(56) References Cited

U.S. PATENT DOCUMENTS 6,547,551 B2 *  4/2003  Omi .................... B29C 47/0023
                                                     425/133.1
6,645,421 B1 * 11/2003  Sanderson .............. B29C 49/18
                                                     264/511
(Continued)

FOREIGN PATENT DOCUMENTS

DE        2 256 945          5/1973
DE     196 00 872 A1         7/1997
(Continued)

OTHER PUBLICATIONS

English Translation of DE02541765.*
(Continued)

*Primary Examiner* — Matthew J Daniels
*Assistant Examiner* — Hana C Page
(74) *Attorney, Agent, or Firm* — Oblon, McClelland, Maier & Neustadt, L.L.P.

(57) ABSTRACT

A method for manufacturing a hollow body, typically a tank, from a plastic material. The method includes molding a preform into shells in a molding tool; joining an insert to an inner surface of a shell of said shells, the insert defining a sub volume within the hollow body to be made; joining together the shells to form the hollow body by closing the molding tool and applying a main pressure to a main volume enclosed by the shells. It is proposed to apply a sub pressure to the sub volume while applying the main pressure to the main volume, such that a pressure difference between the main volume and the sub volume is bigger than 0.20 bar (P1'−P2'>0.20 bar) and smaller than 3.00 bar (P1'−P2'<3.00 bar).

19 Claims, 6 Drawing Sheets

(51) Int. Cl.
  *B29C 49/04* (2006.01)
  *B29C 49/20* (2006.01)
  *B29C 49/78* (2006.01)
  *B29C 49/60* (2006.01)
  *B29C 65/02* (2006.01)
  *B29L 31/00* (2006.01)
  *B60K 15/03* (2006.01)

(52) U.S. Cl.
  CPC .............. *B29C 49/20* (2013.01); *B29C 49/60* (2013.01); *B29C 49/783* (2013.01); *B29C 65/02* (2013.01); *B29C 2049/0057* (2013.01); *B29C 2049/0063* (2013.01); *B29C 2049/2008* (2013.01); *B29L 2031/712* (2013.01); *B29L 2031/7172* (2013.01); *B60K 15/03177* (2013.01); *B60K 2015/03032* (2013.01); *B60K 2015/03453* (2013.01)

(58) Field of Classification Search
  USPC ........................................................ 156/242
  See application file for complete search history.

(56) References Cited

U.S. PATENT DOCUMENTS

| | | | |
|---|---|---|---|
| 2001/0015513 A1 | 8/2001 | Schaftingen et al. | |
| 2004/0012126 A1* | 1/2004 | Ohno | B29C 47/065 264/523 |
| 2010/0139842 A1* | 6/2010 | Criel | B29C 49/20 156/92 |
| 2012/0114505 A1* | 5/2012 | Pansegrouw | B60P 7/065 417/54 |
| 2014/0202975 A1* | 7/2014 | Tom | B67D 7/025 215/12.1 |
| 2015/0306807 A1* | 10/2015 | Borchert | B29C 49/58 156/245 |
| 2016/0075074 A1* | 3/2016 | Dukaj | B29C 47/0054 264/516 |

FOREIGN PATENT DOCUMENTS

| | | |
|---|---|---|
| DE | 10 2012 023 035 B4 | 2/2017 |
| EP | 1 110 697 A2 | 6/2001 |
| EP | 2 484 509 A1 | 8/2012 |
| EP | 2 809 494 B1 | 9/2015 |
| FR | 2 918 915 A1 | 1/2009 |
| WO | WO 90/11176 | 10/1990 |
| WO | WO 2010/006900 A1 | 1/2010 |

OTHER PUBLICATIONS

European Search Report dated Nov. 12, 2015 in European Application 15305799.7 filed on May 27, 2015 ( with written opinion).
Opposition to the European Patent No. EP 3098055, issued May 30, 2018.

\* cited by examiner

METHOD FOR MANUFACTURING A HOLLOW BODY, IN PARTICULAR A FUEL TANK

FIELD OF INVENTION

The field of the invention relates to a method for manufacturing a hollow body, in particular a liquid or gas tank, and more in particular a fuel tank or an urea tank for use in a vehicle.

BACKGROUND

PCT application with publication number WO 2010/006900 in the name of the applicant discloses a process for manufacturing a plastic fuel tank by molding a parison using a mold comprising two cavities and a core, and the content of WO 2010/006900 is incorporated herein by reference.

European patent application with publication number EP 1 110 697 in the name of the applicant discloses a manufacturing technology called Twin Sheet Blow Molding (TBSM), and the content of EP 1 110 697 is incorporated herein by reference.

Another known technique for manufacturing hollow bodies is Twin Sheet Thermoforming.

The insertion of accessories into a parison intended subsequently to be blown or thermoformed in order to produce a hollow body is itself well known and found in many industrial applications in the manufacture of hollow bodies, particularly in that of liquid and gas tanks. However, ensuring a good fixation, an in particular a tight welding, of an insert to an inner wall of a hollow body that is manufactured using a molding process, whilst avoiding damage to the insert, is proven to be difficult. In particular, the introduction of an insert that defines a closed volume within the hollow body may be critical when produced by means of the previously mentioned techniques, since the differential pressure to be applied during the method for the molding of the preforms also acts on the insert introduced into the hollow body, which may lead to the destruction of parts thereof or to the collapse of the insert.

SUMMARY

The object of embodiments of the invention is to provide a method for manufacturing a hollow body which allows for a good fixation, and in particular a tight welding, of an insert to an inner wall of the hollow body whilst avoiding that the insert collapses or is otherwise damaged.

According to a first aspect of the invention there is provided a method for manufacturing a hollow body, typically a tank, from a plastic material. The method comprising the steps of: molding a preform into shells in a molding tool; joining an insert to an inner surface of a shell of said shells, said insert defining a sub volume within the hollow body to be made; joining together the shells to form the hollow body by closing the molding tool and applying a main pressure ($P1'$) to a main volume enclosed by the shells, whilst applying a sub pressure ($P2'$) to the sub volume. The main and sub pressure are chosen such that a pressure difference between the main volume and the sub volume is bigger than 0.20 bar ($P1'-P2'>0.20$ bar) and smaller than 3.00 bar ($P1'-P2'<3.00$ bar).

Embodiments of the invention are based on the insight that using a predetermined pressure difference between the main volume and the sub volume allows on the one hand obtaining a good adherence and tight welding of the insert to the inner wall of the hollow body whilst on the other hand avoiding damage to the insert and/or the collapsing of the insert. This pressure difference may be optimized in function of the type of insert, the size of the insert, the materials to be welded, etc.

In an exemplary embodiment the pressure difference between the main volume and the sub volume is smaller than 2.00 bar ($P1'-P2'<2.00$ bar).

In an exemplary embodiment the pressure difference between the main volume and the sub volume is bigger than 0.5 bar ($0.5<P1'-P2'$).

In an exemplary embodiment the molding tool comprises two cavities and a core, and the step of molding a preform into shells comprises:
  introduction of a preform in the form of a parison into the cavities;
  introduction of a core inside the parison, said core having first been fitted with the insert;
  closure of the molding tool so that the cavities come into leaktight contact with the core;
  pressing of the parison against the cavities by blowing through the core and/or applying a vacuum behind the cavities.

Preferably the joining of an insert to the inner surface of the shell comprises installing the insert on the inner surface of the parison using a device attached to the core; and the method further comprises: opening the mold to withdraw the core before the step of joining the shells.

For the purposes of the invention, a preform may be in the form of a shell or may be substantially elongate or spread out in a plane.

In an exemplary embodiment the joining of an insert to the inner surface of the shell comprises: arranging the insert in the shell against the inner surface and closing the molding tool with a core inserted between the shells; and applying a first pressure to a main volume enclosed by the shells and the core, whilst applying a second pressure to the sub volume defined by the insert. Preferably the first pressure $P1$ is larger that the second pressure $P2$. More preferably $0.5<P1-P2<2$ bar. The first pressure is preferably lower than the main pressure that is applied in the subsequent step where the shells are joined.

In an exemplary embodiment applying the main pressure and the sub pressure is performed using a main line and a sub line distinct from the main line, respectively. Preferably, the main line is provided with a main valve and the sub line is provided with a sub-valve, and the method further comprises controlling the main valve and the sub valve for synchronizing the applying of pressure to the main volume and the sub volume.

In another exemplary embodiment applying the main pressure and the sub pressure is performed using a main line and a sub line connected to the main line, respectively, wherein there is provided a pressure reducing means in the sub line.

In yet another exemplary embodiment applying the main pressure and the sub pressure is performed using a venturi device.

In a preferred embodiment applying the sub pressure is performed through an inflation needle. The inflation needle is used to pierce a wall of the shells. Similarly, applying the main pressure may performed through an inflation needle, with which a wall of the shells is pierced.

In a preferred embodiment the main pressure is higher than 4 bar, preferably higher than 7 bar.

In a preferred embodiment the step of molding a preform into shells in a molding tool is performed at a pressure (P) which is lower than the main pressure (P1').

In a preferred embodiment the insert is a ventilation assembly. However, the term "insert" is understood to mean any object or device or component which can be generally associated with the hollow body in its usual method of use or operation and which interacts with it in order to fulfil certain useful functions. Non-limiting examples of such inserts are: a line such as a venting line, a valve, a cavity, a liquid pump, a nipple, a reservoir or a baffle internal to the hollow body, a ventilation device, a liquid trap, etc. In particular, in the example of a venting line, embodiments of the invention will allow for a reduced risk that the venting line collapses during molding.

In embodiments of the invention the wall thickness of the shells is typically between 1 mm and 15 mm, and preferably between 3 and 10 mm. The insert wall around the sub volume defined by the insert is typically between 1 mm and 5 mm, preferably between 2 mm and 4 mm. Such thicknesses work well in combination with the above mentioned pressure differences.

The hollow body produced by the method according to the invention is made of plastic, that is to say a material comprising at least one polymer made of synthetic resin. All types of plastic may be suitable. Plastics that are very suitable belong to the category of thermoplastics. The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, without being restrictive: random copolymers, sequenced copolymers, block copolymers and graft copolymers. Any type of thermoplastic polymer or copolymer whose melting point is below the decomposition temperature is suitable. Synthetic thermoplastics which have a melting range spread out over at least 10 degrees Celsius are particularly suitable. As examples of such materials, there are those which exhibit polydispersity in their molecular mass. In particular, it is possible to use polyolefins, grafted polyolefins, thermoplastic polymers, polyketones, polyamides and copolymers thereof. One copolymer often used is the copolymer ethylene-vinyl alcohol (EVOH). A blend of polymers or copolymers can also be used, as can a compound of polymeric materials with inorganic, organic and/or natural fillers such as, for example, but not restrictively: carbon, salts and other inorganic derivatives, and natural or polymeric fibres. It is also possible to use multi-layered structures consisting of stacked layers fastened to one another, comprising at least one of the polymers or copolymers described above. Such multi-layered structures may be obtained by means of a coextrusion head or by a technique of completely or partially covering a substrate layer with one or more other layers. An example of the covering technique is the spraying of plastic onto the substrate layer using a spray gun. One polymer often used is polyethylene. Excellent results have been obtained with high-density polyethylene (HDPE).

Preferably, the process is carried out in an integrated manufacturing line comprising the extrusion of the parison (which forms the preform) and its forming by molding The process according to the invention is well suited to the manufacture of hollow bodies which are fuel tanks. In particular, it is suitable for the manufacture of fuel tanks intended to be fitted to motor vehicles.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

FIGS. 1-5 illustrate schematically an exemplary embodiment of a method for manufacturing a hollow body according to an exemplary embodiment of the invention. This embodiment uses in part the principles a manufacturing technology called Twin Sheet Blow Molding (TBSM) which is disclosed in e.g. PCT application with publication number WO 2010/006900 and European patent application with publication number EP 1 110 697 in the name of the applicant, the content of which is incorporated herein by reference. However, in other embodiments of the invention a Twin Sheet Thermoforming process may be used. In yet other embodiments the shells may be molded starting with a single tubular preform or with a single web-like preform which is provided in a U-shaped manner between opposed mold cavities.

Figure 1:
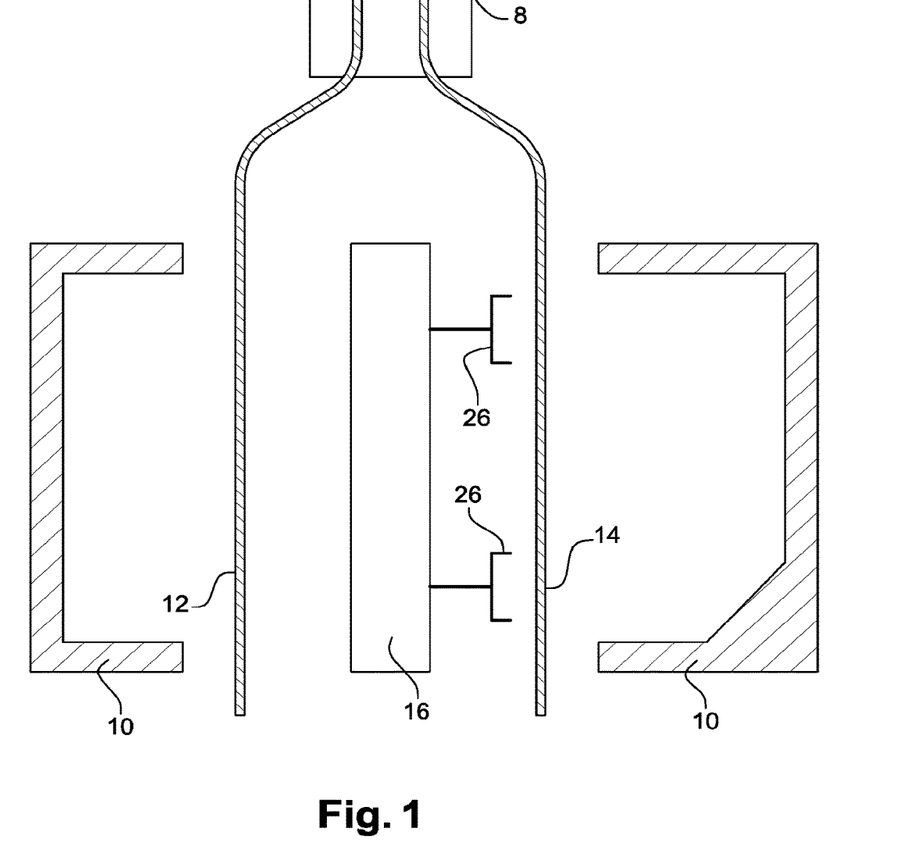
FIG. 1 is a schematic cross-section of a three-part mold (two cavities and a central core) for use in an exemplary embodiment of a method of the invention.
Figure 2:
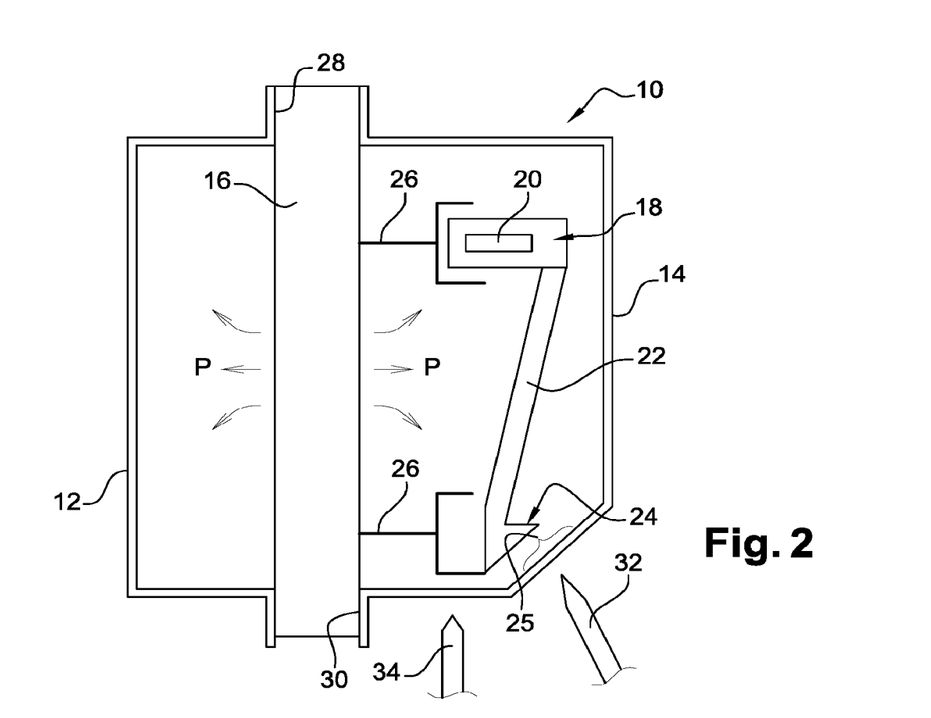
FIGS. 2-5 are cross-sections of the mold of FIG. 1 in further steps of the method.

In a first step, shown in FIG. 1, an extruded parison with two extruded sheets 12 and 14 is formed. In this example the extruded parison is a multi-layer parison, but the skilled person understand that a single-layer parison may be extruded and cut open at diametrically opposed locations to create two sheets. The term "extruded parison" is understood to mean the product obtained by passing, through a die, a composition of at least one thermoplastic melt homogenized in an extruder whose head is terminated by the die. The sheets 12 and 14 have been obtained by extrusion by means of an extruder die 8, immediately before being inserted in the blow molding tool. The sheets 12, 14 are at a high temperature when they enter the blow molding tool. The sheets 12, 14 are positioned in the blow molding tool in the position in which the two opposite mold cavities 10 of the blow molding tool are at a distance of each other.

A core 16 is positioned in the center of the mold, between the two mold cavities 10. The core 16 comprises moving means 26 for carrying different elements which need to be placed in the hollow body. More in particular, the core 16 may carry internal accessories of an internal ventilation circuit, as well as tubes connecting those accessories.

The internal ventilation circuit which is schematically represented in FIGS. 2-5 as two accessories namely a check valve 18 provided with a valve member 20 and an internal port 24, as well as a tube 22 connecting the check valve 18 with the internal port 24, supported by the core 16 using moving means 26. Those moving means 26 which may be electronically controlled allow positioning the assembly of the internal ventilation circuit within the hollow body in a precise manner. The internal ventilation circuit is integrally formed when carried by the core 16 between the shells 12 and 14, i.e. the one or more tubes 22 connect the internal accessories between them. The internal ventilation circuit is not in fluid communication with the internal part of the hollow body when the valve is closed. During the blow molding process, the valve 18 is closed. Stated differently, during blow molding, the internal ventilation circuit is a closed volume.

The above described process can be adapted at all types of internal ventilation circuits and other closed volume parts regardless of the accessories in the circuit.

During a first step of the method the two mold cavities 10 are approached from both sides of the core 16 such that the mold is closed, whereupon air under pressure is injected between the core and each sheet 12, 14. In that way the sheets 12 and 14 are shaped to form the shells 12, 14 of the hollow body, here a fuel tank. This results in the situation of FIG. 2.

The parison is preformed and has approximately the form of the future hollow body, but the edges 28 and 30 of the two sheets are separated from each other by the core 16. The mold cavity 10 on the right of the mold is provided with an inflation needle 32 for injecting air under a pressure P2, or, according to a variant, any other gas under pressure, see FIGS. 2 and 3. Further, air under a first pressure P1 is provided through the core 16 into the main volume delimited by the sheets 12, 14.

Figure 3:
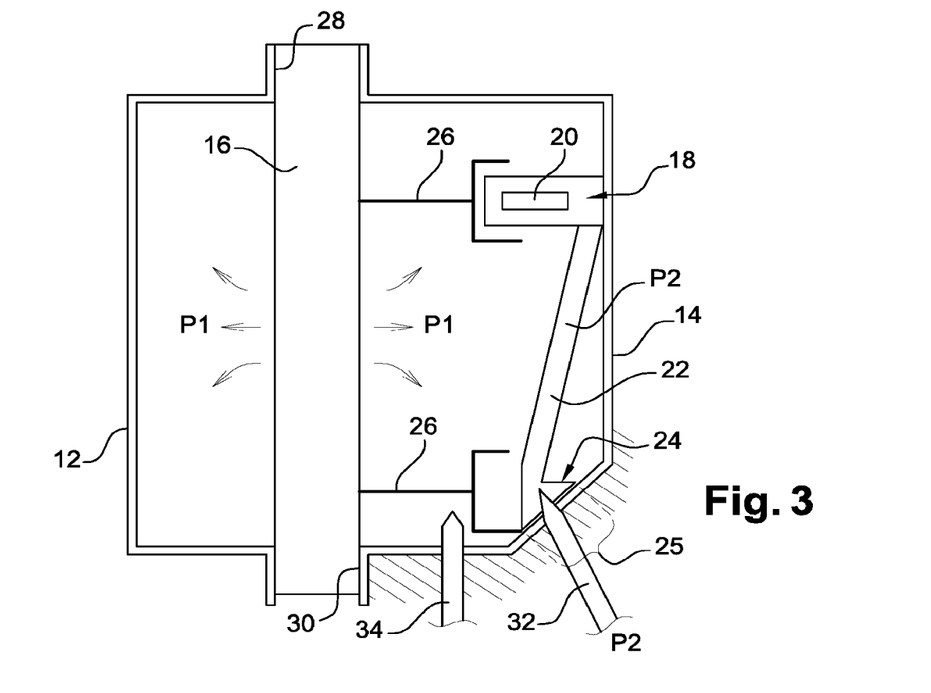

As shown in FIG. 3, immediately after the blow molding of the parison, the accessories 18 and 24 are positioned using means 26, against sheet 14. Next, inflation needles 32, 34 are introduced in the sheet 14, such that the inflation needles 32 and 34 traverse the sheet 14 and are in fluid communication with a sub volume defined by the internal ventilation circuit and the main volume, respectively. In this step the first pressure P1 is applied via the core 16, and the inflation needle 34 is not used, i.e. the inflation needle 34 is closed off e.g. by closing a valve connected to the inflation needle 34.

The accessories 18 and 24 of the internal ventilation circuit are welded to the sheet 14, which is at that moment in time still at a high temperature. More in particular the internal port 24 is welded to the sheet 14 in a region 25. This is achieved by blowing air under a first pressure P1 into the main volume defined by the sheets 12, 14, whilst injecting air under a second pressure P2 in the internal ventilation circuit by means of an inflation needle 32 which penetrates into the sheet 14 in the middle of the welding region 25 of the internal port 24 and discharges in the interior of the internal port 24. The inflation needle 32 is then in fluid communication with the internal ventilation circuit. Preferably the first pressure P1 is larger that the second pressure P2. More preferably 0.5<P1−P2 <2 bar.

Figure 4:
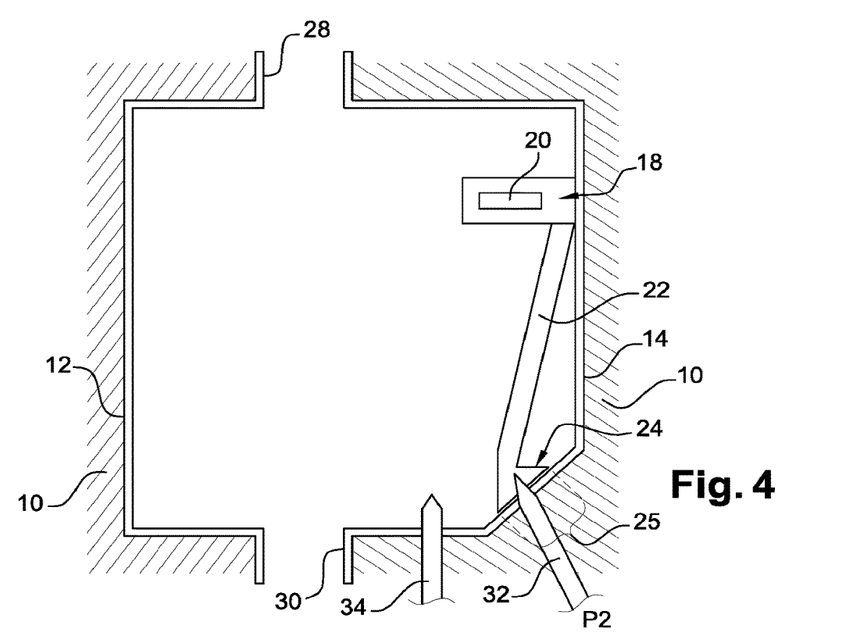

As shown in FIG. 4, after forming the shells and welding the internal ventilation circuit, the blowing is stopped for opening the molding tool and the core 16 is withdrawn from between the mold cavities 10. The injection of air under pressure by inflation needle 32 is also stopped so as to avoid any risk of overpressure in the internal ventilation circuit.

Figure 5:
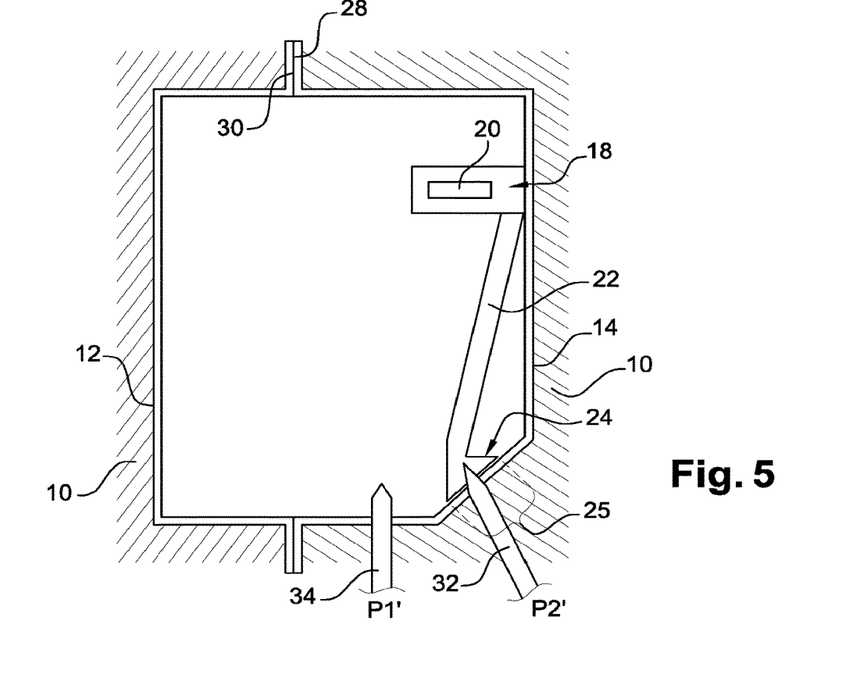

As shown in FIG. 5, now the two mold cavities 10 of the mold are approached until the edges 28 and 30 of the two shells 12 and 14 are in contact. The mold is again closed, a main pressure is applied in the main volume between the shells by means of an inflation needle 34 which is pierced through a shell, and a sub pressure is applied in the internal ventilation circuit by means of the inflation needle 32, such that the fuel tank is given its final shape. In other words, the shells are joined together to form the hollow body by closing the blow molding tool and applying a main pressure (P1') to a main volume enclosed by the shells, whilst applying a sub pressure (P2') to the sub volume. The applied pressures P1' and P2' are such that a pressure difference between the main volume and the sub volume is bigger than 0.20 bar (P1'−P2'>0.20 bar) and smaller than 3.00 bar (P1'−P2' <3.00 bar), and preferably 0.5<P1'−P2'<2.00 bar. By having such a pressure difference the insert is pushed against the inner surface of a shell such that a very good welding is obtained. At the same time the pressure difference is not too high such that collapsing of the insert, and in particular of the tube 22, is avoided.

Next, the shells 12 and 14 are allowed to cool for solidifying the walls of the fuel tank, and then the blowing is stopped. Finally, a ventilation pipe (not shown) connected to an external ventilation line may be arranged in the region 25 of the wall of the tank, such that the internal port 24 is connected through the hole left behind by the inflation needle 32. A gas-tight welding between internal port 24 and shell 14 ensures that the sealing between the internal ventilation circuit and the interior of the tank is maintained.

The internal port 24 has the role of an internal port suitable for being connected to an external ventilation line. According to a variant the connector 24 is a connector having an additional function to separate liquid and vapor.

Figure 6A:
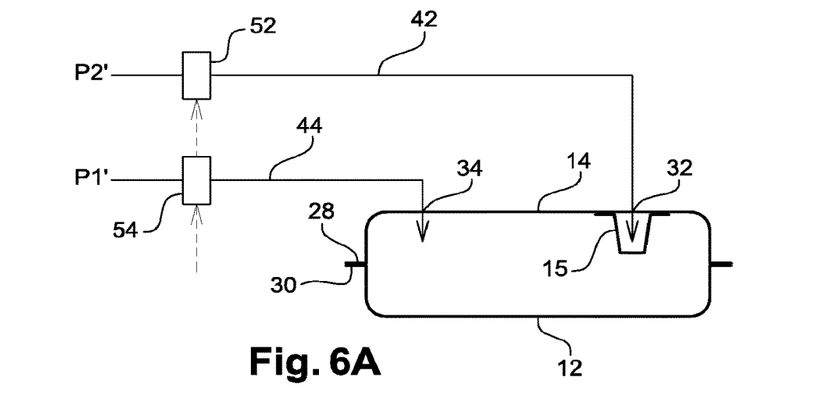
FIGS. 6A-6C illustrate schematically three variants for obtaining a pressure difference between the main volume and the sub volume in exemplary embodiments of the invention.
Figure 6B:
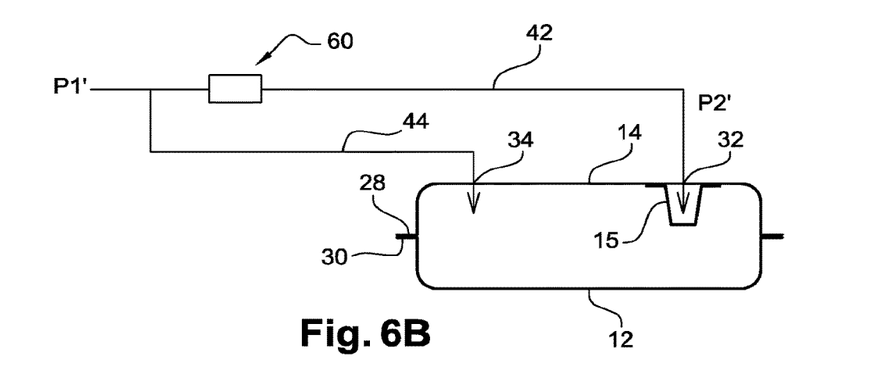
Figure 6C:
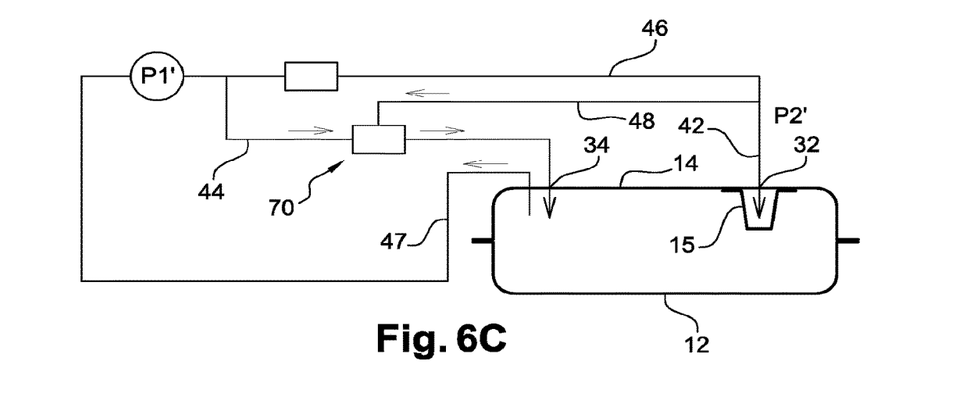

FIGS. 6A to 6C illustrate three exemplary embodiments of variants of systems for realizing a pressure difference between the main volume between the shells 12, 14 and a sub volume within an insert 15 attached to an inner wall of one of the shells 12, 14. The shells 12, 14 of FIGS. 6A-6C may be manufactured as disclosed above in connection with FIGS. 1-4, but may also be blow-moulded or thermoformed in a different manner. In a final step illustrated in FIGS. 6A-6C edges 28, 30 of the two shells 12, 14 are welded to each other in order to create the hollow body and at the same time the insert 15 is securely fixed (welded) to the inner wall of hollow body.

In the exemplary embodiment of FIG. 6A a main line 44 provided with a main valve 54 is connected to an inflation needle 34 piercing through a wall of the shell 14 and discharging in the main volume. A sub line 42 provided with a sub-valve 52 is connected to an inflation needle 32 piercing through an area of the shell 14 where the insert is attached such that the inflation needle 32 discharges in the enclosed sub volume defined by the insert 15. In this embodiment the main line 44 and the sub line 42 are distinct lines. The method further comprises controlling the main valve 54 and the sub valve 52 for synchronizing the applying of pressure to the main volume (P1') and the applying of pressure (P2') to the sub volume.

In the exemplary embodiment of FIG. 6B a main line 44 is connected to an inflation needle 34 piercing through a wall of the shell 14 and discharging in the main volume. A sub line 42 provided with a pressure reducing means 60 is connected between the main line 44 and an inflation needle 32 piercing through an area of the shell 14 where the insert is attached such that the inflation needle 32 discharges in the enclosed sub volume defined by the insert 15. Such an embodiment has the advantage that the applying of pressure may be synchronized without any special control means. The pressure reducing means 60 may be e.g. a flow expander, a proportional valve, a calibrated leak, etc.

In the exemplary embodiment of FIG. 6C a main line 44 is connected through a venturi device 70 to an inflation needle 34 piercing through a wall of the shell 14 and discharging in the main volume. A sub line 46, 42 is connected between the main line 44 and an inflation needle 32 piercing through an area of the shell 14 where the insert is attached, such that the inflation needle 32 discharges in the enclosed sub volume defined by the insert 15. A portion of the flow through sub line 46 is directed to venturi device 70, see line 48, such that the pressure P2' in the sub volume is lower than the pressure P1' in the main volume. The flow through the main volume is discharged via a return line 47. This return line 47 may pass through the same needle 34 as the inlet line. In such an embodiment the main pressure P1' performs a sweeping for the blowing in the main volume but also a cooling, whereby it is possible to use the venturi device 70 for creating the pressure difference applied between needles 32 and 34.

Although not drawn in FIGS. 6A and 6B, the skilled person understands that there may also be provided a return line in the embodiments of FIGS. 6A and 6B, wherein this return line may optionally pass through the same needle 34 as the main line 44.

Also in the embodiments of FIGS. 6A-6C the applied pressures P1' and P2' are such that a pressure difference between the main volume and the sub volume is bigger than 0.20 bar (P1'−P2'>0.20 bar) and smaller than 3.00 bar (P1'−P2' <3.00 bar), and preferably 0.5<P1'−P2'<2.00 bar. By having such a pressure difference the insert is pushed against the inner surface of a shell such that a very good welding is obtained. At the same time the pressure difference is not too high such that collapsing of the insert is avoided.

FIGS. 7A-7E illustrate subsequent steps of another exemplary embodiment of the method of the invention for manufacturing a hollow body, typically a tank, from a plastic material.

Figure 7A:
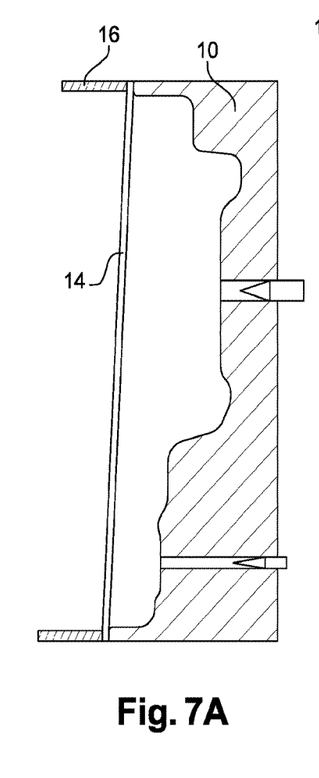
FIGS. 7A-7E illustrate subsequent steps of another exemplary embodiment of the method of the invention.
Figure 7B:
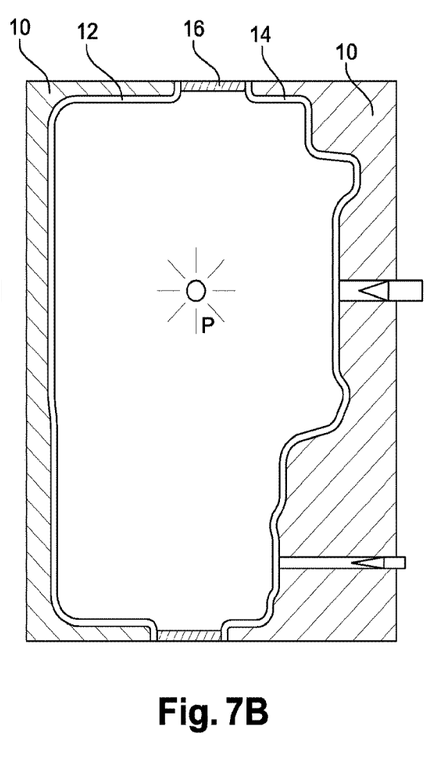

FIGS. 7A and 7B illustrate a first step in which a preform 10, e.g. an extruded parison, is blow-molded into shells 12, 14 in a blow molding tool comprising mold cavities 10 and a core 16 (FIG. 7A illustrates only one mold cavity 10, but it is understood that there is a second mold cavity 10 as in FIG. 7B). The pressure P applied in the first step may be between 3 and 7 bar, e.g. 5 bar. The temperature is typically higher than 130 degrees Celsius for a HDPE material, and preferably between 170 and 220 degrees Celsius.

Figure 7C:
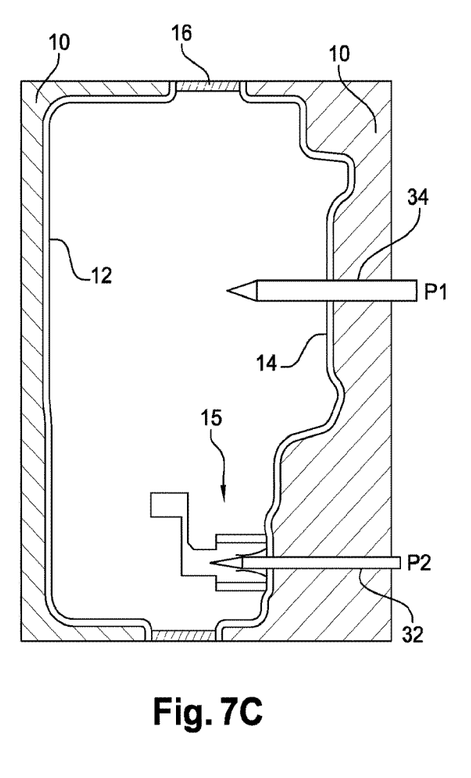

FIG. 7C illustrates a second step in which an insert 15, here a venting assembly, is arranged against an inner surface of a shell 14 of said shells 12, 14, said insert 15 defining a sub volume within the hollow body to be made. The joining of the insert 15 to the inner surface of the shell 14 further comprises closing the blow molding tool with the core 16 inserted between the shells 12, 14, and applying a first pressure P1 to a main volume enclosed by the shells 12, 14 and the core 16, whilst applying a second pressure P2 to the sub volume defined by the insert 15. Preferably 0.5<P1−P2<2 bar. The first pressure P1 is typically a pressure between 3 and 7 bar, e.g. 5 bar. The pressure P1 and P2 may be applied via inflation needles 34, 32 piercing through the shell 14 and discharging in the main volume and the sub volume, respectively. The temperature is typically higher than 130 degrees Celsius for a HDPE material, and preferably between 170 and 220 degrees Celsius.

Figure 7D:
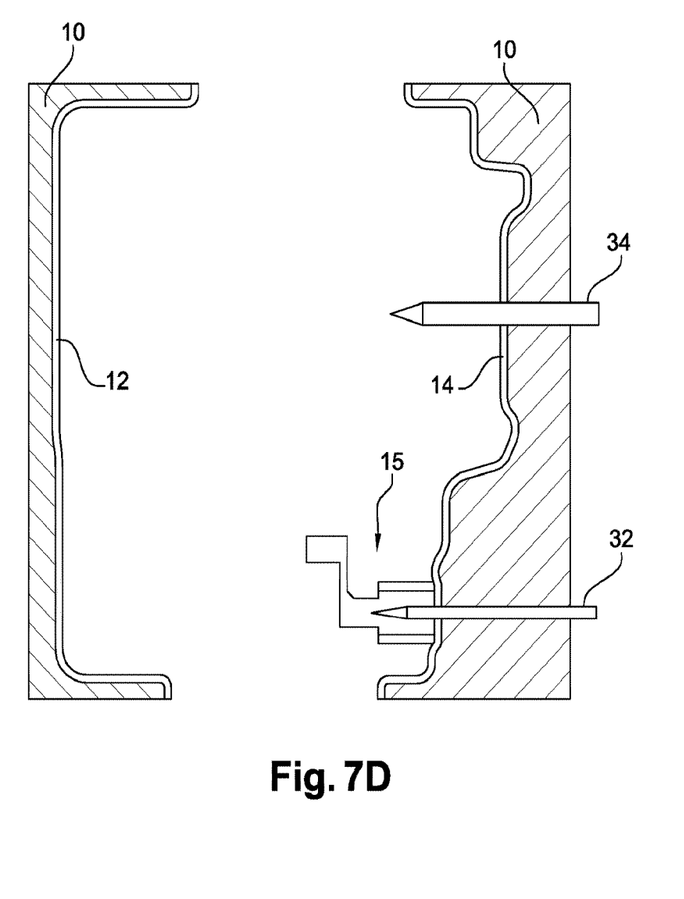
Figure 7E:
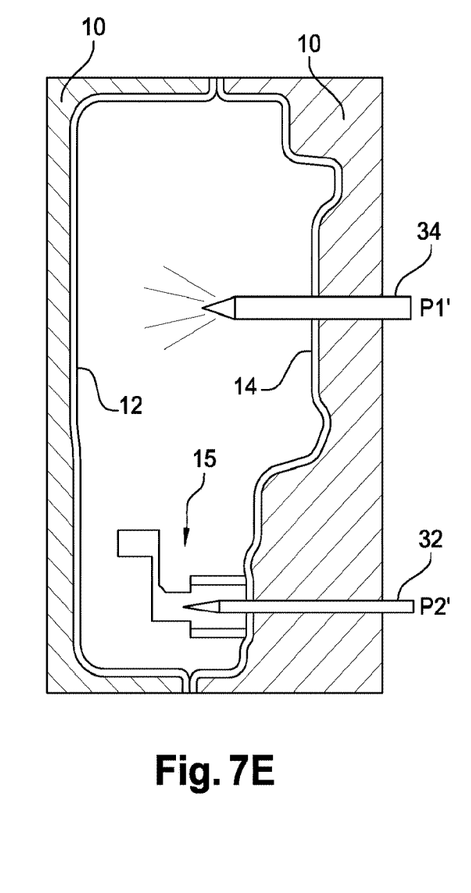

FIG. 7D illustrates a third step which consists of opening the molding tool and removing the core 16. FIG. 7E illustrates the final blow molding step without the core 16. The shells 12, 14 are joined to form the hollow body by closing the blow molding tool and applying a main pressure (P1')to a main volume enclosed by the shells 12, 14, wherein there is applied a sub pressure (P2') to the sub volume defined by the insert 15 whilst applying the main pressure (P1') to the main volume, and this such that a pressure difference between the main volume and the sub volume is bigger than 0.20 bar (P1'−P2'>0.20 bar) and smaller than 3.00 bar (P1'−P2'<3.00 bar). Preferably the pressure difference between the main volume and the sub volume is smaller than 2.00 bar (P1'−P2'<2.00 bar), and the pressure difference between the main volume and the sub volume is bigger than 0.5 bar (0.5<P1'−P2'). The main pressure (P1') is preferably higher than P1, and is e.g. between 8 and 12 bar. The temperature is typically higher than 130 degrees Celsius for a HDPE material, and preferably between 170 and 220 degrees Celsius.

In embodiments of the invention the wall thickness of the shells 12, 14 is preferably between 3 and 10 mm, and of the walls of the insert 15 is preferably between 2 and 4 mm. Such thicknesses work well in combination with the above mentioned pressure ranges.

Whilst the principles of the invention have been set out above in connection with specific embodiments, it is to be understood that this description is merely made by way of example and not as a limitation of the scope of protection which is determined by the appended claims.

The invention claimed is:

1. A method for manufacturing a hollow body from a plastic material, said method comprising:
    molding a preform into shells in a molding tool;
    joining an insert to an inner surface of a shell of said shells, said insert defining a sub volume within the hollow body to be made; and
    joining together the shells to form the hollow body by closing the molding tool and applying a main pressure to a main volume enclosed by the shells,
    wherein a sub pressure is applied to the sub volume while the main pressure is applied to the main volume, such that a pressure difference between the main volume and the sub volume is bigger than 0.20 bar and smaller than 3.00 bar, and
    wherein a contour of the insert is defined by a wall and the insert is selected from a line, a valve, a liquid pump, a nipple, a baffle, a ventilation device and a liquid trap.

2. The method of claim 1, wherein the pressure difference between the main volume and the sub volume is smaller than 2.00 bar.

3. The method of claim 1, wherein the pressure difference between the main volume and the sub volume is bigger than 0.5 bar.

4. The method of claim 1, wherein the joining of an insert to the inner surface of the shell comprises:
    arranging the insert in the shell against the inner surface and closing the molding tool with a core inserted between the shells; and
    applying a first pressure to a main volume enclosed by the shells and the core, while applying a second pressure to the sub volume.

5. The method of claim 4, wherein a pressure difference between the first pressure and the second pressure is bigger than 0.20 bar and smaller than 3.00 bar.

6. The method of claim 1, wherein the molding tool comprises two cavities and a core, and wherein the molding of a preform into shells comprises:
    introducing a preform in the form of a parison into the cavities;
    introducing a core inside the parison, said core having first been fitted with the insert;
    closing the molding tool so that the cavities come into leaktight contact with the core; and
    pressing the parison against the cavities by blowing through the core and/or applying a vacuum behind the cavities.

7. The method of claim 6, wherein the joining of the insert to the inner surface of the shell comprises installing the insert on an inner wall of the parison using a device attached to the core, the method further comprising:

opening the mold to withdraw the core before the joining of the shells.

8. The method of claim 1, wherein applying the main pressure and the sub pressure is performed using a main line and a sub line distinct from the main line, respectively.

9. The method of claim 8, wherein the main line is provided with a main valve and the sub line is provided with a sub-valve, and the method further comprises controlling the main valve and the sub valve for synchronizing the applying of pressure to the main volume and the sub volume.

10. The method of claim 1, wherein applying the main pressure and the sub pressure is performed using a main line and a sub line connected to the main line, respectively, wherein there is provided a pressure reducer in the sub line.

11. The method of claim 1, wherein applying the main pressure and/or the sub pressure is performed through an inflation needle, with which a wall of the shells is pierced.

12. The method of claim 1, wherein the main pressure is higher than 4 bar.

13. The method of claim 1, wherein the molding a preform into shells in a molding tool is performed at a pressure which is lower than the main pressure.

14. The method of claim 12, wherein the main pressure is higher than 7 bar.

15. A method for manufacturing a hollow body from a plastic material, said method comprising:

molding a preform into shells in a molding tool;

joining an insert to an inner surface of a shell of said shells, said insert defining a sub volume within the hollow body to be made; and joining together the shells to form the hollow body by closing the molding tool and applying a main pressure to a main volume enclosed by the shells, wherein a sub pressure is applied to the sub volume while the main pressure is applied to the main volume, such that a pressure difference between the main volume and the sub volume is bigger than 0.20 bar and smaller than 3.00 bar, wherein the joining of an insert to the inner surface of the shell comprises:

arranging the insert in the shell against the inner surface and closing the molding tool with a core inserted between the shells; and applying a first pressure to a main volume enclosed by the shells and the core, while applying a second pressure to the sub volume, wherein the main pressure is greater than the sub pressure, and wherein a contour of the insert is defined by a wall and the insert is selected from a line, a valve, a liquid pump, a nipple, a baffle, a ventilation device and a liquid trap.

16. A method for manufacturing a hollow body from a plastic material, said method comprising:

molding a preform into shells in a molding tool;

joining an insert to an inner surface of a shell of said shells, said insert defining a sub volume within the hollow body to be made; and joining together the shells to form the hollow body by closing the molding tool and applying a main pressure to a main volume enclosed by the shells, wherein a sub pressure is applied to the sub volume while the main pressure is applied to the main volume, such that a pressure difference between the main volume and the sub volume is bigger than 0.20 bar and smaller than 3.00 bar, wherein the main pressure and the sub pressure are applied using a venturi device, wherein a contour of the insert is defined by a wall and the insert is selected from a line, a valve, a liquid pump, a nipple, a baffle, a ventilation device and a liquid trap.

17. The method of claim 1, wherein the sub volume is located inside the main volume and a maximum of the sub volume is substantially smaller than the main volume.

18. The method of claim 15, wherein the sub volume is located inside the main volume and a maximum of the sub volume is substantially smaller than the main volume.

19. The method of claim 16, wherein the sub volume is located inside the main volume and a maximum of the sub volume is substantially smaller than the main volume.

\* \* \* \* \*